(12) United States Patent
Geldenbott et al.

(10) Patent No.: US 8,068,587 B2
(45) Date of Patent: Nov. 29, 2011

(54) NATIONWIDE TABLE ROUTING OF VOICE OVER INTERNET PROTOCOL (VOIP) EMERGENCY CALLS

(75) Inventors: Gerhard Geldenbott, Seattle, WA (US); Gordon J. Hines, Kirkland, WA (US); Jeff Martin, Longmont, CO (US); Ed Day, Seattle, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 342 days.

(21) Appl. No.: 12/461,702

(22) Filed: Aug. 21, 2009

(65) Prior Publication Data

US 2010/0046721 A1    Feb. 25, 2010

Related U.S. Application Data

(60) Provisional application No. 61/136,255, filed on Aug. 22, 2008.

(51) Int. Cl.
*H04M 11/04* (2006.01)
(52) U.S. Cl. ...................... 379/45; 455/556.1
(58) Field of Classification Search .............. 379/37–52; 370/352; 455/404.2, 556.1
See application file for complete search history.

(56) References Cited

U.S. PATENT DOCUMENTS

| | | |
|---|---|---|
| 1,103,073 A | 7/1914 | O'Connel |
| 4,445,118 A | 4/1984 | Taylor et al. |
| 4,494,119 A | 1/1985 | Wimbush |
| 4,651,156 A | 3/1987 | Martinez |
| 4,706,275 A | 11/1987 | Kamil |
| 4,891,638 A | 1/1990 | Davis |
| 4,891,650 A | 1/1990 | Sheffer |
| 4,952,928 A | 8/1990 | Carroll |
| 4,972,484 A | 11/1990 | Theile et al. |
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |

(Continued)

FOREIGN PATENT DOCUMENTS

WO    WO9921380    4/1999

(Continued)

OTHER PUBLICATIONS

Bhalla et al, TELUS, Technology Strategy—LBS Roaming Summit, Sep. 19, 2006.

(Continued)

*Primary Examiner* — Curtis Kuntz
*Assistant Examiner* — Maria El-Zoobi
(74) *Attorney, Agent, or Firm* — William H. Bollman

(57) ABSTRACT

The present invention is used in an emergency network to identify and provide the correct public safety access point (PSAP) to service an emergency call originating from a Voice Over Internet Protocol (VoIP) subscriber. Data stores in an emergency services network associate PSAPs to an input ZIP code obtained from a street address returned from an MSAG relating to a VoIP call, and PSAPs to an input ESN. An emergency caller's civic street address is matched against a nationwide MSAG data store to result in a MSAG ESN. From the street address, the emergency caller's ZIP code is matched to a PSAP in an appropriate ZIP/PSAP data store. A matching PSAP from both the ZIP/PSAP and PSAP/ESN data stores determines with great reliability the identity of the proper PSAP for that emergency caller.

7 Claims, 5 Drawing Sheets

U.S. PATENT DOCUMENTS

| | | |
|---|---|---|
| 5,068,891 A | 11/1991 | Marshall |
| 5,070,329 A | 12/1991 | Jasinaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,166,972 A | 11/1992 | Smith |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Scheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Caroll |
| 5,283,570 A | 2/1994 | DeLucca |
| 5,289,527 A | 2/1994 | Tiedmann, Jr. |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicki |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimulah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckery |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,434,789 A | 7/1995 | Fraker |
| 5,454,024 A | 9/1995 | Lebowitz |
| 5,461,390 A | 10/1995 | Hoshen |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaugh |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,504,491 A | 4/1996 | Chapman |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff et al. |
| 5,530,914 A | 6/1996 | McPheters |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff et al. |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Angstrom |
| 5,583,774 A | 12/1996 | Diesel |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff et al. |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,276 A | 6/1997 | Brugger |
| 5,661,755 A | 8/1997 | Van De Kerkhof et al. |
| 5,682,600 A | 10/1997 | Salin |
| 5,689,245 A | 11/1997 | Noreen |
| 5,699,053 A | 12/1997 | Jonsson |
| 5,704,029 A | 12/1997 | Wright, Jr. |
| 5,712,900 A | 1/1998 | Maupin |
| 5,721,781 A | 2/1998 | Deo |
| 5,731,785 A | 3/1998 | Lemelson |
| 5,740,534 A | 4/1998 | Ayesrt |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Muntully |
| 5,787,357 A | 7/1998 | Salin |
| 5,794,142 A | 8/1998 | Vantilla |
| 5,797,094 A | 8/1998 | Houde |
| 5,806,000 A | 9/1998 | Vo |
| 5,809,415 A | 9/1998 | Rossmann |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khue |
| 5,835,907 A | 11/1998 | Newman |
| 5,841,396 A | 11/1998 | Kransner |
| 5,857,201 A | 1/1999 | Wright, Jr. et al. |
| 5,864,667 A | 1/1999 | Barkan |
| 5,874,914 A | 2/1999 | Krasner |
| 5,896,369 A | 4/1999 | Warsta |
| 5,920,821 A | 7/1999 | Seaholtz |
| 5,922,074 A | 7/1999 | Richard et al. |
| 5,930,250 A | 7/1999 | Klok |
| 5,930,701 A | 7/1999 | Skog |
| 5,937,344 A | 8/1999 | Zicker |
| 5,943,399 A | 8/1999 | Bannister |
| 5,945,944 A | 8/1999 | Kraser |
| 5,946,629 A | 8/1999 | Sawyer |
| 5,946,630 A | 8/1999 | Willars |
| 5,950,130 A | 9/1999 | Coursey |
| 5,950,137 A | 9/1999 | Kim |
| 5,953,398 A | 9/1999 | Hill |
| 5,960,362 A | 9/1999 | Grob |
| 5,974,054 A | 10/1999 | Couts |
| 5,978,685 A | 11/1999 | Laiho |
| 5,983,099 A | 11/1999 | Yao et al. |
| 5,987,323 A | 11/1999 | Houtari |
| 5,998,111 A | 12/1999 | Abe |
| 5,999,124 A | 12/1999 | Sheynblat |
| 6,014,602 A | 1/2000 | Kithol |
| 6,032,051 A | 2/2000 | Hall |
| 6,035,025 A | 3/2000 | Hanson |
| 6,049,710 A | 4/2000 | Nilsson |
| 6,052,081 A | 4/2000 | Krasner |
| 6,058,300 A | 5/2000 | Hanson |
| 6,058,338 A | 5/2000 | Agashe et al. |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,067,045 A | 5/2000 | Castelloe |

| Patent No. | Date | Inventor |
|---|---|---|
| 6,070,067 A | 5/2000 | Nguyen |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski, Jr. |
| 6,101,378 A | 8/2000 | Barabash |
| 6,104,931 A | 8/2000 | Havinis |
| 6,108,533 A | 8/2000 | Brohoff |
| 6,121,923 A | 9/2000 | King |
| 6,122,503 A | 9/2000 | Daly |
| 6,122,520 A | 9/2000 | Want |
| 6,124,810 A | 9/2000 | Segal et al. |
| 6,131,067 A | 10/2000 | Girerd |
| 6,133,874 A | 10/2000 | Krasner |
| 6,134,483 A | 10/2000 | Vayanos et al. |
| 6,138,003 A | 10/2000 | Kingdow |
| 6,148,197 A | 11/2000 | Bridges |
| 6,148,198 A | 11/2000 | Anderson |
| 6,149,353 A | 11/2000 | Nilsson |
| 6,150,980 A | 11/2000 | Krasner |
| 6,154,172 A | 11/2000 | Piccionelli |
| 6,169,891 B1 | 1/2001 | Grorham |
| 6,169,901 B1 | 1/2001 | Boucher |
| 6,169,902 B1 | 1/2001 | Kawamoto |
| 6,173,181 B1 | 1/2001 | Losh |
| 6,178,505 B1 | 1/2001 | Scheider |
| 6,178,506 B1 | 1/2001 | Quick, Jr. |
| 6,181,935 B1 | 1/2001 | Gossman |
| 6,181,939 B1 | 1/2001 | Ahvenainen |
| 6,185,427 B1 | 2/2001 | Krasner |
| 6,188,354 B1 | 2/2001 | Soliman et al. |
| 6,188,752 B1 | 2/2001 | Lesly |
| 6,188,909 B1 | 2/2001 | Alanara |
| 6,189,098 B1 | 2/2001 | Kaliski, Jr. |
| 6,195,557 B1 | 2/2001 | Havinis |
| 6,198,431 B1 | 3/2001 | Gibson |
| 6,199,045 B1 | 3/2001 | Ginniger |
| 6,199,113 B1 | 3/2001 | Alegre |
| 6,205,330 B1 | 3/2001 | Winbladh |
| 6,208,290 B1 | 3/2001 | Krasner |
| 6,208,854 B1 | 3/2001 | Roberts |
| 6,215,441 B1 | 4/2001 | Moeglein |
| 6,219,557 B1 | 4/2001 | Havinis |
| 6,223,046 B1 | 4/2001 | Hamill-Keays |
| 6,226,529 B1 | 5/2001 | Bruno |
| 6,239,742 B1 | 5/2001 | Krasner |
| 6,247,135 B1 | 6/2001 | Feague |
| 6,249,680 B1 | 6/2001 | Wax |
| 6,249,744 B1 | 6/2001 | Morita |
| 6,249,873 B1 | 6/2001 | Richard et al. |
| 6,253,074 B1 | 6/2001 | Carlsson |
| 6,253,203 B1 | 6/2001 | O'Flaherty |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,275,937 B1 | 8/2001 | Hailpern |
| 6,289,373 B1 | 9/2001 | Dezonno |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat et al. |
| 6,317,594 B1 | 11/2001 | Gossman |
| 6,321,091 B1 | 11/2001 | Holland |
| 6,321,092 B1 | 11/2001 | Fitch |
| 6,321,250 B1 | 11/2001 | Knape |
| 6,321,257 B1 | 11/2001 | Kotola |
| 6,324,542 B1 | 11/2001 | Wright, Jr. |
| 6,327,473 B1 | 12/2001 | Soliman et al. |
| 6,327,479 B1 | 12/2001 | Mikkola |
| 6,330,454 B1 | 12/2001 | Verdonk |
| 6,333,919 B2 | 12/2001 | Gafney |
| 6,360,102 B1 | 3/2002 | Havinis |
| 6,363,254 B1 | 3/2002 | Jones |
| 6,367,019 B1 | 4/2002 | Ansell |
| 6,370,389 B1 | 4/2002 | Isomursu |
| 6,377,209 B1 | 4/2002 | Krasner |
| 6,377,810 B1 | 4/2002 | Geiger |
| 6,400,314 B1 | 6/2002 | Krasner |
| 6,400,958 B1 | 6/2002 | Isomursu |
| 6,411,254 B1 | 6/2002 | Moeglein |
| 6,421,002 B2 | 7/2002 | Krasner |
| 6,427,001 B1 | 7/2002 | Contractor |
| 6,433,734 B1 | 8/2002 | Krasner |
| 6,434,381 B1 | 8/2002 | Moore |
| 6,442,391 B1 | 8/2002 | Johansson |
| 6,449,473 B1 | 9/2002 | Raivisto |
| 6,449,476 B1 | 9/2002 | Hutchison, IV |
| 6,456,852 B2 | 9/2002 | Bar |
| 6,463,272 B1 | 10/2002 | Wallace |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs et al. |
| 6,512,922 B1 | 1/2003 | Burg et al. |
| 6,512,930 B2 | 1/2003 | Sandegren |
| 6,515,623 B2 | 2/2003 | Johnson |
| 6,519,466 B2 | 2/2003 | Pande et al. |
| 6,522,682 B1 | 2/2003 | Kohli et al. |
| 6,526,026 B1 | 2/2003 | Menon |
| 6,529,500 B1 | 3/2003 | Pandharipande |
| 6,529,722 B1 * | 3/2003 | Heinrich et al. ............ 455/404.1 |
| 6,529,829 B2 | 3/2003 | Turetzky et al. |
| 6,531,982 B1 | 3/2003 | White et al. |
| 6,538,757 B1 | 3/2003 | Sansone |
| 6,539,200 B1 | 3/2003 | Schiff |
| 6,539,232 B2 | 3/2003 | Hendrey |
| 6,539,304 B1 | 3/2003 | Chansarkar |
| 6,542,464 B1 | 4/2003 | Takeda |
| 6,542,734 B1 | 4/2003 | Abrol et al. |
| 6,542,743 B1 | 4/2003 | Soliman |
| 6,549,776 B1 | 4/2003 | Joong |
| 6,549,844 B1 | 4/2003 | Egberts |
| 6,553,236 B1 | 4/2003 | Dunko |
| 6,556,832 B1 | 4/2003 | Soliman |
| 6,560,461 B1 | 5/2003 | Fomukong |
| 6,560,534 B2 | 5/2003 | Abraham et al. |
| 6,564,261 B1 | 5/2003 | Gudjonsson |
| 6,570,530 B2 | 5/2003 | Gaal et al. |
| 6,571,095 B1 | 5/2003 | Koodli |
| 6,574,558 B2 | 6/2003 | Kohli |
| 6,580,390 B1 | 6/2003 | Hay |
| 6,584,552 B1 | 6/2003 | Kuno |
| 6,587,691 B1 | 7/2003 | Granstam |
| 6,594,500 B2 | 7/2003 | Bender et al. |
| 6,597,311 B2 | 7/2003 | Sheynblat et al. |
| 6,600,927 B2 | 7/2003 | Hamilton |
| 6,603,973 B1 | 8/2003 | Foladare |
| 6,606,495 B1 | 8/2003 | Korpi et al. |
| 6,606,554 B2 | 8/2003 | Edge |
| 6,609,004 B1 | 8/2003 | Morse et al. |
| 6,611,757 B2 | 8/2003 | Brodie |
| 6,618,593 B1 | 9/2003 | Drutman |
| 6,618,670 B1 | 9/2003 | Chansarkar |
| 6,621,452 B2 | 9/2003 | Knockeart et al. |
| 6,621,810 B1 | 9/2003 | Leung |
| 6,628,233 B2 | 9/2003 | Knockeart et al. |
| 6,630,093 B1 | 10/2003 | Jones |
| 6,633,255 B2 | 10/2003 | Krasner |
| 6,640,184 B1 | 10/2003 | Rabe |
| 6,650,288 B1 | 11/2003 | Pittt |
| 6,661,372 B1 | 12/2003 | Girerd |
| 6,665,539 B2 | 12/2003 | Sih et al. |
| 6,665,541 B1 | 12/2003 | Krasner et al. |
| 6,671,620 B1 | 12/2003 | Garin et al. |
| 6,677,894 B2 | 1/2004 | Sheynblat et al. |
| 6,680,694 B1 | 1/2004 | Knockeart et al. |
| 6,680,695 B2 | 1/2004 | Turetzky et al. |
| 6,687,504 B1 | 2/2004 | Raith |
| 6,694,258 B2 | 2/2004 | Johnson et al. |
| 6,697,629 B1 | 2/2004 | Grilli et al. |
| 6,701,144 B2 | 3/2004 | Kirbas et al. |
| 6,703,971 B2 | 3/2004 | Pande et al. |
| 6,703,972 B2 | 3/2004 | van Diggelmen |
| 6,704,651 B2 | 3/2004 | van Diggelmen |
| 6,707,421 B1 | 3/2004 | Drury et al. |
| 6,714,793 B1 | 3/2004 | Carey |
| 6,718,174 B2 | 4/2004 | Vayanos |

| Patent No. | Date | Name |
|---|---|---|
| 6,720,915 B2 | 4/2004 | Sheynblat |
| 6,721,578 B2 | 4/2004 | Minear et al. |
| 6,721,871 B2 | 4/2004 | Piispanen |
| 6,724,342 B2 | 4/2004 | Bloebaum et al. |
| 6,725,159 B2 | 4/2004 | Krasner |
| 6,731,940 B1 | 5/2004 | Nagendran |
| 6,734,821 B2 | 5/2004 | van Diggelen |
| 6,738,013 B2 | 5/2004 | Orler |
| 6,738,800 B1 | 5/2004 | Aquilon |
| 6,741,842 B2 | 5/2004 | Goldberg et al. |
| 6,744,856 B2 | 6/2004 | Karnik |
| 6,744,858 B1 | 6/2004 | Ryan |
| 6,745,038 B2 | 6/2004 | Callaway |
| 6,747,596 B2 | 6/2004 | Orler |
| 6,748,195 B1 | 6/2004 | Philips |
| 6,751,464 B1 | 6/2004 | Burg et al. |
| 6,756,938 B2 | 6/2004 | Zhao et al. |
| 6,757,544 B2 | 6/2004 | Rangarajan et al. |
| 6,757,545 B2 | 6/2004 | Nowak |
| 6,771,742 B2 * | 8/2004 | Mathis et al. ............ 379/45 |
| 6,771,971 B2 | 8/2004 | Smith |
| 6,772,340 B1 | 8/2004 | Peinado |
| 6,775,255 B1 | 8/2004 | Roy |
| 6,775,267 B1 | 8/2004 | Kung |
| 6,775,534 B2 | 8/2004 | Lindgren |
| 6,775,655 B1 | 8/2004 | Peinado |
| 6,775,802 B2 | 8/2004 | Gaal |
| 6,778,136 B2 | 8/2004 | Groneneyer |
| 6,778,885 B2 | 8/2004 | Agashe et al. |
| 6,781,963 B2 | 8/2004 | Crockett |
| 6,788,249 B1 | 9/2004 | Farmer et al. |
| 6,795,444 B1 | 9/2004 | Vo |
| 6,795,699 B1 | 9/2004 | McCraw et al. |
| 6,799,049 B1 | 9/2004 | Zellner |
| 6,799,050 B1 | 9/2004 | Krasner |
| 6,801,159 B2 | 10/2004 | Swope et al. |
| 6,804,524 B1 | 10/2004 | Vandermeijjden |
| 6,807,534 B1 | 10/2004 | Erickson |
| 6,810,323 B1 | 10/2004 | Bullock et al. |
| 6,813,560 B2 | 11/2004 | van Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong et al. |
| 6,820,069 B1 | 11/2004 | Kogan |
| 6,829,475 B1 | 12/2004 | Lee et al. |
| 6,832,373 B2 | 12/2004 | O'Neill |
| 6,839,020 B1 | 1/2005 | Geier et al. |
| 6,839,021 B2 | 1/2005 | Sheynblat et al. |
| 6,839,417 B2 | 1/2005 | Weisman |
| 6,842,715 B1 | 1/2005 | Gaal |
| 6,847,618 B2 | 1/2005 | Laursen |
| 6,847,822 B1 | 1/2005 | Dennison |
| 6,853,916 B2 | 2/2005 | Fuchs et al. |
| 6,856,282 B2 | 2/2005 | Mauro et al. |
| 6,861,980 B1 | 3/2005 | Rowitch et al. |
| 6,865,171 B1 | 3/2005 | Nilsson |
| 6,865,395 B2 | 3/2005 | Riley |
| 6,867,733 B2 | 3/2005 | Sandhu |
| 6,867,734 B2 | 3/2005 | Voor |
| 6,873,854 B2 | 3/2005 | Crockett |
| 6,876,734 B1 | 4/2005 | Summers |
| 6,882,850 B2 | 4/2005 | McConnell |
| 6,885,874 B2 | 4/2005 | Grube |
| 6,885,940 B2 | 4/2005 | Brodie et al. |
| 6,888,497 B2 | 5/2005 | King et al. |
| 6,888,932 B2 | 5/2005 | Snip |
| 6,895,238 B2 | 5/2005 | Nevell et al. |
| 6,895,249 B2 | 5/2005 | Gaal |
| 6,900,758 B1 | 5/2005 | Mann et al. |
| 6,903,684 B1 | 6/2005 | Simic et al. |
| 6,904,029 B2 | 6/2005 | Fors et al. |
| 6,907,224 B2 | 6/2005 | Younis |
| 6,907,238 B2 | 6/2005 | Leung |
| 6,912,230 B1 | 6/2005 | Salkini |
| 6,912,395 B2 | 6/2005 | Berer et al. |
| 6,912,545 B1 | 6/2005 | Lundy |
| 6,915,208 B2 | 7/2005 | Garin et al. |
| 6,917,331 B2 | 7/2005 | Groneneyer |
| 6,930,634 B2 | 8/2005 | Peng et al. |
| 6,937,187 B2 | 8/2005 | van Diggelen |
| 6,937,872 B2 | 8/2005 | Krasner |
| 6,940,826 B1 | 9/2005 | Simard |
| 6,940,950 B2 | 9/2005 | Dickinson |
| 6,941,144 B2 | 9/2005 | Stein |
| 6,944,540 B2 | 9/2005 | King et al. |
| 6,947,772 B2 | 9/2005 | Minear et al. |
| 6,950,058 B1 | 9/2005 | Davis et al. |
| 6,957,068 B2 | 10/2005 | Hutchison |
| 6,957,073 B2 | 10/2005 | Bye |
| 6,961,019 B1 | 11/2005 | McConnell et al. |
| 6,961,562 B2 | 11/2005 | Ross |
| 6,963,557 B2 | 11/2005 | Knox |
| 6,965,754 B2 | 11/2005 | King |
| 6,965,767 B2 | 11/2005 | Maggenti |
| 6,968,044 B2 | 11/2005 | Beason |
| 6,968,195 B2 | 11/2005 | Nowak |
| 6,970,917 B1 | 11/2005 | Kushwaha |
| 6,973,320 B2 | 12/2005 | Brown et al. |
| 6,975,266 B2 | 12/2005 | Abraham et al. |
| 6,978,453 B2 | 12/2005 | Rao et al. |
| 6,980,816 B2 | 12/2005 | Rohles |
| 6,985,105 B1 | 1/2006 | Pitt |
| 6,985,747 B2 | 1/2006 | Chithambaram |
| 6,993,355 B1 | 1/2006 | Pershan |
| 6,996,720 B1 | 2/2006 | DeMello |
| 6,999,782 B2 | 2/2006 | Shaughnessy |
| 7,024,321 B1 | 4/2006 | Deninger et al. |
| 7,024,393 B1 | 4/2006 | Peinado |
| 7,031,724 B2 | 4/2006 | Ross |
| 7,047,411 B1 | 5/2006 | DeMello |
| 7,065,351 B2 | 6/2006 | Carter et al. |
| 7,065,507 B2 | 6/2006 | Mohammed |
| 7,072,667 B2 | 7/2006 | Orlik |
| 7,079,857 B2 | 7/2006 | Maggenti |
| 7,103,018 B1 | 9/2006 | Hansen |
| 7,103,574 B1 | 9/2006 | Peinado |
| 7,106,717 B2 | 9/2006 | Rousseau |
| 7,113,128 B1 | 9/2006 | Pitt |
| 7,136,466 B1 | 11/2006 | Gao |
| 7,136,838 B1 | 11/2006 | Peinado |
| 7,151,946 B2 | 12/2006 | Maggenti |
| 7,174,153 B2 | 2/2007 | Ehlers |
| 7,177,397 B2 | 2/2007 | McCalmont |
| 7,177,398 B2 | 2/2007 | Meer |
| 7,177,399 B2 | 2/2007 | Dawson |
| 7,200,380 B2 | 4/2007 | Havlark |
| 7,209,758 B1 | 4/2007 | Moll |
| 7,209,969 B2 | 4/2007 | Lahti |
| 7,218,940 B2 | 5/2007 | Niemenmaa |
| 7,221,959 B2 | 5/2007 | Lindqvist |
| 7,245,900 B1 | 7/2007 | Lamb |
| 7,246,187 B1 | 7/2007 | Ezra |
| 7,260,186 B2 | 8/2007 | Zhu |
| 7,321,773 B2 | 1/2008 | Hines |
| 7,330,899 B2 | 2/2008 | Wong |
| 7,369,508 B2 | 5/2008 | Parantainen |
| 7,369,530 B2 | 5/2008 | Keagy |
| 7,382,773 B2 | 6/2008 | Schoeneberger |
| 7,394,896 B2 | 7/2008 | Norton |
| 7,412,049 B1 | 8/2008 | Koch |
| 7,424,293 B2 | 9/2008 | Zhu |
| 7,426,380 B2 | 9/2008 | Hines |
| 7,428,571 B2 | 9/2008 | Ichimura |
| 7,436,785 B1 | 10/2008 | McMullen |
| 7,440,442 B2 | 10/2008 | Grabelsky |
| 7,495,608 B1 | 2/2009 | Chen |
| 7,573,982 B2 | 8/2009 | Breen |
| 7,602,886 B1 | 10/2009 | Beech |
| 7,623,447 B1 | 11/2009 | Faccin |
| 7,711,094 B1 * | 5/2010 | Olshansky et al. ............ 379/45 |
| 7,747,258 B2 | 6/2010 | Farmer |
| 7,764,961 B2 | 7/2010 | Zhu et al. |
| 7,783,297 B2 | 8/2010 | Ishii |
| 7,787,611 B1 | 8/2010 | Kotelly |
| 2001/0011247 A1 | 8/2001 | O'Flaherty |
| 2001/0040886 A1 | 11/2001 | Jimenez |
| 2002/0037735 A1 | 3/2002 | Maggenti |

| | | |
|---|---|---|
| 2002/0052214 A1 | 5/2002 | Maggenti |
| 2002/0055924 A1 | 5/2002 | Liming |
| 2002/0061760 A1 | 5/2002 | Maggenti |
| 2002/0069529 A1 | 6/2002 | Wieres |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0085538 A1 | 7/2002 | Leung |
| 2002/0086676 A1 | 7/2002 | Hendry |
| 2002/0098832 A1 | 7/2002 | Fleischer |
| 2002/0099802 A1 | 7/2002 | Marsh |
| 2002/0102996 A1 | 8/2002 | Jenkins |
| 2002/0102999 A1 | 8/2002 | Maggenti |
| 2002/0111172 A1 | 8/2002 | DeWolf |
| 2002/0112047 A1 | 8/2002 | Kushwaha |
| 2002/0118650 A1 | 8/2002 | Jagadeesan |
| 2002/0123327 A1 | 9/2002 | Vataja |
| 2002/0126656 A1 | 9/2002 | Park |
| 2002/0138650 A1 | 9/2002 | Yamamoto |
| 2002/0154221 A1 | 10/2002 | Ishimaru |
| 2002/0158777 A1 | 10/2002 | Flick |
| 2002/0173317 A1 | 11/2002 | Nkyanen |
| 2002/0191595 A1 | 12/2002 | Mar |
| 2003/0009277 A1 | 1/2003 | Fan |
| 2003/0009602 A1 | 1/2003 | Jacobs |
| 2003/0012148 A1 | 1/2003 | Peters |
| 2003/0013449 A1 | 1/2003 | Hose |
| 2003/0016804 A1 | 1/2003 | Sheha |
| 2003/0026245 A1 | 2/2003 | Ejzak |
| 2003/0037163 A1 | 2/2003 | Kitada et al. |
| 2003/0040272 A1 | 2/2003 | Lelievre |
| 2003/0065788 A1 | 4/2003 | Salomaki |
| 2003/0072318 A1 | 4/2003 | Lam |
| 2003/0078064 A1 | 4/2003 | Chan |
| 2003/0078886 A1 | 4/2003 | Minear |
| 2003/0081557 A1 | 5/2003 | Mettala |
| 2003/0081752 A1 | 5/2003 | Trandal |
| 2003/0086539 A1 | 5/2003 | McCalmont |
| 2003/0101329 A1 | 5/2003 | Lahti |
| 2003/0101341 A1 | 5/2003 | Kettler |
| 2003/0103484 A1 | 6/2003 | Oommen et al. |
| 2003/0108176 A1 | 6/2003 | Kung |
| 2003/0109245 A1 | 6/2003 | McCalmont |
| 2003/0114148 A1 | 6/2003 | Albertson |
| 2003/0114157 A1 | 6/2003 | Spitz |
| 2003/0115261 A1 | 6/2003 | Mohammed |
| 2003/0119521 A1 | 6/2003 | Tipnis |
| 2003/0119528 A1 | 6/2003 | Pew |
| 2003/0125021 A1 | 7/2003 | Tell |
| 2003/0135493 A1 | 7/2003 | Phelan |
| 2003/0137961 A1 | 7/2003 | Tsirtsis |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0186709 A1 | 10/2003 | Rhodes |
| 2003/0196105 A1 | 10/2003 | Fineberg |
| 2003/0204640 A1 | 10/2003 | Sahinoja |
| 2003/0222901 A1 | 12/2003 | Houck |
| 2003/0223381 A1 | 12/2003 | Schroderus |
| 2004/0002326 A1 | 1/2004 | Maher |
| 2004/0032485 A1 | 2/2004 | Stephens |
| 2004/0043775 A1 | 3/2004 | Kennedy |
| 2004/0044623 A1 | 3/2004 | Wake |
| 2004/0047461 A1 | 3/2004 | Weisman |
| 2004/0064500 A1 | 4/2004 | Kolar |
| 2004/0068724 A1 | 4/2004 | Gardner |
| 2004/0098497 A1 | 5/2004 | Banet |
| 2004/0107143 A1 | 6/2004 | Niemi |
| 2004/0132465 A1 | 7/2004 | Mattila |
| 2004/0157175 A1 | 8/2004 | Matsumoto |
| 2004/0181689 A1 | 9/2004 | Kiyoto |
| 2004/0185875 A1 | 9/2004 | Diacakis |
| 2004/0190497 A1 | 9/2004 | Knox |
| 2004/0192271 A1 | 9/2004 | Eisner |
| 2004/0198332 A1 | 10/2004 | Lundsgaard |
| 2004/0198386 A1 | 10/2004 | Dupray |
| 2004/0203919 A1 | 10/2004 | Ross |
| 2004/0205151 A1 | 10/2004 | Sprigg |
| 2004/0229632 A1 | 11/2004 | Flynn |
| 2004/0242238 A1 | 12/2004 | Wang |
| 2004/0267445 A1 | 12/2004 | De Luca |
| 2005/0027102 A1 | 2/2005 | Iffland |
| 2005/0028034 A1 | 2/2005 | Gantman |
| 2005/0039135 A1 | 2/2005 | Othmer |
| 2005/0039178 A1 | 2/2005 | Marolia |
| 2005/0041578 A1 | 2/2005 | Huotari |
| 2005/0043037 A1 | 2/2005 | Loppe |
| 2005/0053209 A1 | 3/2005 | D'Evelyn |
| 2005/0083911 A1 | 4/2005 | Grabelsky |
| 2005/0086467 A1 | 4/2005 | Asokan |
| 2005/0090236 A1 | 4/2005 | Schwinke |
| 2005/0107673 A1 | 5/2005 | Ball |
| 2005/0112030 A1 | 5/2005 | Gaus |
| 2005/0119012 A1 | 6/2005 | Merheb |
| 2005/0134504 A1 | 6/2005 | Harwood |
| 2005/0135569 A1 | 6/2005 | Dickinson |
| 2005/0136885 A1 | 6/2005 | Kaltsukis |
| 2005/0148353 A1 | 7/2005 | Hicks |
| 2005/0169248 A1 | 8/2005 | Truesdale |
| 2005/0174991 A1 | 8/2005 | Keagy |
| 2005/0181805 A1 | 8/2005 | Gallagher |
| 2005/0186948 A1 | 8/2005 | Gallagher |
| 2005/0188078 A1 | 8/2005 | Kotzin |
| 2005/0192822 A1 | 9/2005 | Hartenstein |
| 2005/0195954 A1 | 9/2005 | Klein |
| 2005/0201529 A1 | 9/2005 | Nelson |
| 2005/0209995 A1 | 9/2005 | Aksu |
| 2005/0213537 A1 | 9/2005 | Ingimundarson |
| 2005/0213716 A1* | 9/2005 | Zhu et al. .................... 379/45 |
| 2005/0232252 A1 | 10/2005 | Hoover |
| 2005/0255857 A1 | 11/2005 | Kim |
| 2005/0259675 A1 | 11/2005 | Tuohino et al. |
| 2005/0265318 A1 | 12/2005 | Khartabil |
| 2005/0271029 A1 | 12/2005 | Iffland |
| 2005/0272424 A1 | 12/2005 | Gallagher |
| 2005/0272449 A1 | 12/2005 | Gallagher |
| 2005/0282518 A1 | 12/2005 | D'Evelyn |
| 2005/0287979 A1 | 12/2005 | Rollender |
| 2005/0289097 A1 | 12/2005 | Trossen |
| 2006/0008065 A1 | 1/2006 | Longman et al. |
| 2006/0026288 A1 | 2/2006 | Acharya |
| 2006/0053225 A1 | 3/2006 | Poikselka |
| 2006/0068753 A1 | 3/2006 | Karpen |
| 2006/0072547 A1* | 4/2006 | Florkey et al. ............. 370/352 |
| 2006/0073812 A1 | 4/2006 | Punaganti |
| 2006/0078094 A1 | 4/2006 | Breen |
| 2006/0079236 A1 | 4/2006 | Del Pino |
| 2006/0120517 A1 | 6/2006 | Moon |
| 2006/0128395 A1 | 6/2006 | Muhonen |
| 2006/0135177 A1 | 6/2006 | Winterbottom |
| 2006/0154665 A1 | 7/2006 | Svensson |
| 2006/0184617 A1 | 8/2006 | Nicholoas |
| 2006/0188083 A1 | 8/2006 | Breen |
| 2006/0189303 A1 | 8/2006 | Rollender |
| 2006/0205383 A1 | 9/2006 | Rollender |
| 2006/0212558 A1 | 9/2006 | Sahinoja |
| 2006/0212562 A1 | 9/2006 | Kushwaha |
| 2006/0234639 A1 | 10/2006 | Kushwaha |
| 2006/0234698 A1 | 10/2006 | Fok et al. |
| 2006/0236258 A1 | 10/2006 | Othmer |
| 2006/0239205 A1 | 10/2006 | Warren |
| 2006/0258380 A1 | 11/2006 | Liebowitz |
| 2006/0293024 A1 | 12/2006 | Benco |
| 2006/0293066 A1 | 12/2006 | Edge |
| 2007/0003024 A1 | 1/2007 | Olivier |
| 2007/0008885 A1 | 1/2007 | Bonner |
| 2007/0022011 A1 | 1/2007 | Altberg |
| 2007/0026854 A1 | 2/2007 | Nath |
| 2007/0026871 A1 | 2/2007 | Wager |
| 2007/0027997 A1 | 2/2007 | Polk |
| 2007/0030539 A1 | 2/2007 | Nath |
| 2007/0036139 A1 | 2/2007 | Patel |
| 2007/0041513 A1 | 2/2007 | Gende |
| 2007/0042765 A1 | 2/2007 | Bailin |
| 2007/0049288 A1 | 3/2007 | Lamprecht |

| | | | |
|---|---|---|---|
| 2007/0060097 A1 | 3/2007 | Edge | |
| 2007/0081635 A1 | 4/2007 | Croak | |
| 2007/0121601 A1 | 5/2007 | Kikinis | |
| 2007/0149213 A1 | 6/2007 | Lamba | |
| 2007/0160036 A1 | 7/2007 | Smith | |
| 2007/0162228 A1 | 7/2007 | Mitchell | |
| 2007/0202844 A1 | 8/2007 | Wilson | |
| 2007/0206568 A1 | 9/2007 | Silver | |
| 2007/0206613 A1 | 9/2007 | Silver | |
| 2007/0238448 A1 | 10/2007 | Gallagher | |
| 2007/0242660 A1 | 10/2007 | Xu | |
| 2007/0263610 A1 | 11/2007 | Mitchell | |
| 2007/0270164 A1 | 11/2007 | Maier | |
| 2008/0037715 A1 | 2/2008 | Prozeniuk | |
| 2008/0063153 A1* | 3/2008 | Krivorot et al. | 379/45 |
| 2008/0065775 A1 | 3/2008 | Polk | |
| 2008/0101552 A1* | 5/2008 | Khan et al. | 379/45 |
| 2008/0117859 A1 | 5/2008 | Shahidi | |
| 2008/0186164 A1 | 8/2008 | Emigh | |
| 2008/0200143 A1* | 8/2008 | Qiu et al. | 455/404.2 |
| 2008/0214202 A1 | 9/2008 | Toomey | |
| 2009/0003312 A1* | 1/2009 | Velazquez et al. | 370/352 |
| 2009/0103687 A1* | 4/2009 | Peters | 379/45 |

FOREIGN PATENT DOCUMENTS

| | | |
|---|---|---|
| WO | PCTUS9928848 | 12/1999 |
| WO | WO01/45342 | 6/2001 |
| WO | PCTUS0146666 | 11/2001 |
| WO | WO2004/025941 | 3/2004 |
| WO | WO2005/051033 | 6/2005 |
| WO | WO2005051033 | 6/2005 |
| WO | WO2007027166 | 3/2007 |

OTHER PUBLICATIONS

Mike McMullen, Sprint, LBS Roaming Summit, Sep. 19, 2006.
Andrew Yeow, BCE, LBS Roaming Summit, Sep. 19, 2006, pp. 1-8.
Nars Haran, U.S. Cellular, Packet Data—Roaming and LBS Overview, Nov. 2, 2007, pp. 1-15.
Qualcomm CDMA Technologies, LBS Control Plane Roaming—80-VD377-1NP A, 2006, pp. 1-10.
Qualcomm CDMA Technologies, MS Resident User Plane LBS Roaming—80-VC718-1 E, 2006, pp. 137.
$3^{rd}$ Generation Partnership Project 2, Position Determination Service Standard for Dual Mode Spread Spectrum Systems, Feb. 16, 2001, pp. i-X, 1-1-1-5, 2-1-2-2, 3-1-3-51, 4-1-4-66, A-1-A2, B-1-B-2, C-1-C-2, D-1-D-2.
Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.
Le-Pond Chin, Jyh-Hong Wen, Ting-Way Liu, The Study of the Interconnection of GSM Mobile Communication System Over IP based Network, May 6, 2001, IEEE, Vehicular Technology Conference, vol. 3, pp. 2219-2223.
Yilin, Ahao, Efficient and reliable data transmission for cellular and GPS based mayday systems, Nov. 1997, IEEE, IEEE Conference on Intelligent Transportation System, 1997, ITSC 97, 555-559.
U.S. Appl. No. 09/539,495, filed Mar. 2000, Abrol.
Extended European Search Report from EPO in European Appl. No. 06827172.5 dated Dec. 29, 2009.
Location Based Services V2 Roaming Support (non proprietary), 80-V8470-2NP A, dated Jan. 27, 2005, pp. 1-56.

* cited by examiner

FIG. 3A

TABLE #1
(ZIP-PSAP TABLE) 100

| ZIP | | PSAP |
|---|---|---|
| 981 | 06 | V530 |
| 981 | 99 | V530 |
| 981 | 21 | V530 |
| 981 | 36 | V530 |
| 981 | 68 | V530 |
| 981 | 05 | V530 |
| 111 | 06 | V999 |
| 121 | 21 | V999 |
| 121 | 21 | V531 |

TABLE #2
(PSAP-ESN TABLE) 200

| PSAP | | ESN |
|---|---|---|
| V53 | 0 | 11111 |
| V53 | 0 | 22222 |
| V53 | 0 | 33333 |
| V53 | 0 | 44444 |
| V53 | 0 | 55555 |
| V99 | 9 | 11111 |
| V99 | 9 | 22222 |
| V99 | 9 | 33333 |

602
604
606
608
610
612
614
616

202  204

US 8,068,587 B2

NATIONWIDE TABLE ROUTING OF VOICE OVER INTERNET PROTOCOL (VOIP) EMERGENCY CALLS

This application claims priority from U.S. Provisional Application No. 61/136,255, entitled "Nationwide Table Routing of Voice Over Internet Protocol (VoIP) Emergency Calls", filed Aug. 22, 2008, the entirety of which is expressly incorporated herein by reference.

BACKGROUND OF THE INVENTION

1. Field of the Invention

This invention relates generally to long distance carriers, Internet Service Providers (ISPs), and information content delivery services/providers and long distance carriers. More particularly, it relates to emergency call systems (e.g., E9-1-1) including wireless and Internet Protocol (IP) based Voice Over Internet Protocol (VoIP) emergency call systems.

2. Background of Related Art 9-1-1 is a phone number widely recognized in North America as an emergency phone number that is used to contact emergency dispatch personnel. Enhanced 9-1-1 (E9-1-1) is defined by an emergency call being selectively routed to an appropriate PSAP, based on a special identifier (P-ANI, or "Pseudo Automatic Number Identifier", also referred to as "ESxK"), and includes the transmission of callback number and location information when 9-1-1 is used. E9-1-1 may be implemented for landline, cellular or VoIP networks. Regardless of the network type, a 9-1-1 service becomes E-9-1-1 when automatic number identification and automatic location information related to the call is provided to the 9-1-1 operator at the PSAP.

A Public Safety Answering Point (PSAP) is a dispatch office that receives 9-1-1 calls from the public. A PSAP may be a local, fire or police department, an ambulance service or a regional office covering all services. As used herein, the term "PSAP" refers to either a PSAP, or to an Emergency Call Center (ECC), a VoIP term.

Distributed Emergency Call Systems in Telecommunications are in general very complex computing systems. Emergency Calls that originate from a VoIP network use well proven routing paradigms already used for Cellular 911 calls, or for traditional Landline 911 calls. These paradigms usually work well, because VoIP customers can usually be grouped into two categories, a mobile one that resembles a cellular user and a stationary one resembling landline usage.

Traditional Landline paradigms provide the most accurate location, but require the subscriber's address to be provisioned into a Landline ALI (Automatic Location Identifier). This pre-provisioning (often referred to as SOI "Service Order Interface" loading) usually takes a few days between the caller notifying their service provider of their address change, and this change being reflected in the Landline ALI. During this window a 911 call will be routed using the "old" data still in the Landline ALI. The fastest possible landline ALI provisioning takes at least several hours.

Landline systems use pre-provisioned Subscriber addresses, where the Landline ALI provisioning process (i.e. SOI) insures a match to an MSAG record, which contains an ESN used to route Emergency Calls to a PSAP.

Cellular systems either use triangulation technologies to find a latitude & longitude of the caller, then use modern GIS systems to query for the PSAP polygon that contains this location. These polygons can lead to a different, neighboring PSAP than an equivalent address provisioned in a Landline ALI, but this discrepancy is accepted by PSAPs because the location itself is likely to be imprecise due to measurement errors—sometimes the location is off by hundreds of feet.

VoIP systems use proprietary technologies, usually based on GIS polygons, or based on provisioning the caller in the traditional Landline ALI which takes at least a few hours, and sometimes as long as a few days.

A significant disadvantage of the conventional technology is that non-mobile VoIP callers who know their street address must choose between (1) their ability to dial 911 immediately, but with the chance that calls will be routed to a neighboring PSAP, possibly delaying responders; and (2) waiting a few hours (up to days), during which their calls will route to the previous PSAP. But after this delay, the call will route to the same PSAP as a traditional landline 911 call.

SUMMARY OF THE INVENTION

In accordance with the invention, a method of providing routing of an emergency call to a reliably proper public safety access point (PSAP) comprises receipt of a request for location relating to an emergency call from an emergency wireless device. A street address associated with the emergency wireless device is obtained. At least one PSAP associated with a ZIP code of the street address is determined, as is at least one PSAP associated with an emergency services number (ESN) assigned to the emergency call. An identity of a matching unique PSAP associated with both a ZIP code of the street address and the ESN is provided for use by a routing device.

A table routing data store in communication with an emergency 911 network in accordance with another aspect of the invention comprises a first table associating input ZIP codes with serving public safety access points (PSAPs). A second table associates input emergency services numbers (ESNs) with PSAPs. A physical interface is in communication with a routing device. In this way an emergency call is reliably routed by the routing device to a PSAP matched in both the first table and the second table to a given emergency call.

BRIEF DESCRIPTION OF THE DRAWINGS

Features and advantages of the present invention will become apparent to those skilled in the art from the following description with reference to the drawings:

FIG. 3A shows exemplary contents of a sample routing table store with data for the sample shown in FIG. 2A, and FIG. 3B shows exemplary contents of a sample routing table store with data for the sample shown in FIG. 2B.

DETAILED DESCRIPTION OF ILLUSTRATIVE EMBODIMENTS

The present invention is used in an emergency network to identify and provide the correct public safety access point (PSAP) to service an emergency call originating from a Voice Over Internet Protocol (VoIP) subscriber. The invention provides data stores in an emergency services network to associate ZIP codes to PSAPs, and PSAPs to emergency service numbers (ESNs).

With a data store on the network including a table that associates ZIP codes to PSAPs serving respective ZIP codes, and a table (either in the same data store or another data store distinct from the ZIP/PSAP data store) that associates PSAPs to ESNs.

In operation, an emergency caller's civic address is matched against a nationwide MSAG data store to result in a Master Street Address Guide (MSAG) Emergency Service Number (ESN). From the street address, the emergency caller's ZIP code is matched to a PSAP in an appropriate ZIP/PSAP data store. A matching PSAP from both the ZIP/PSAP and PSAP/ESN data stores determines with great reliability the identity of the proper PSAP for that emergency caller.

Figure 1:
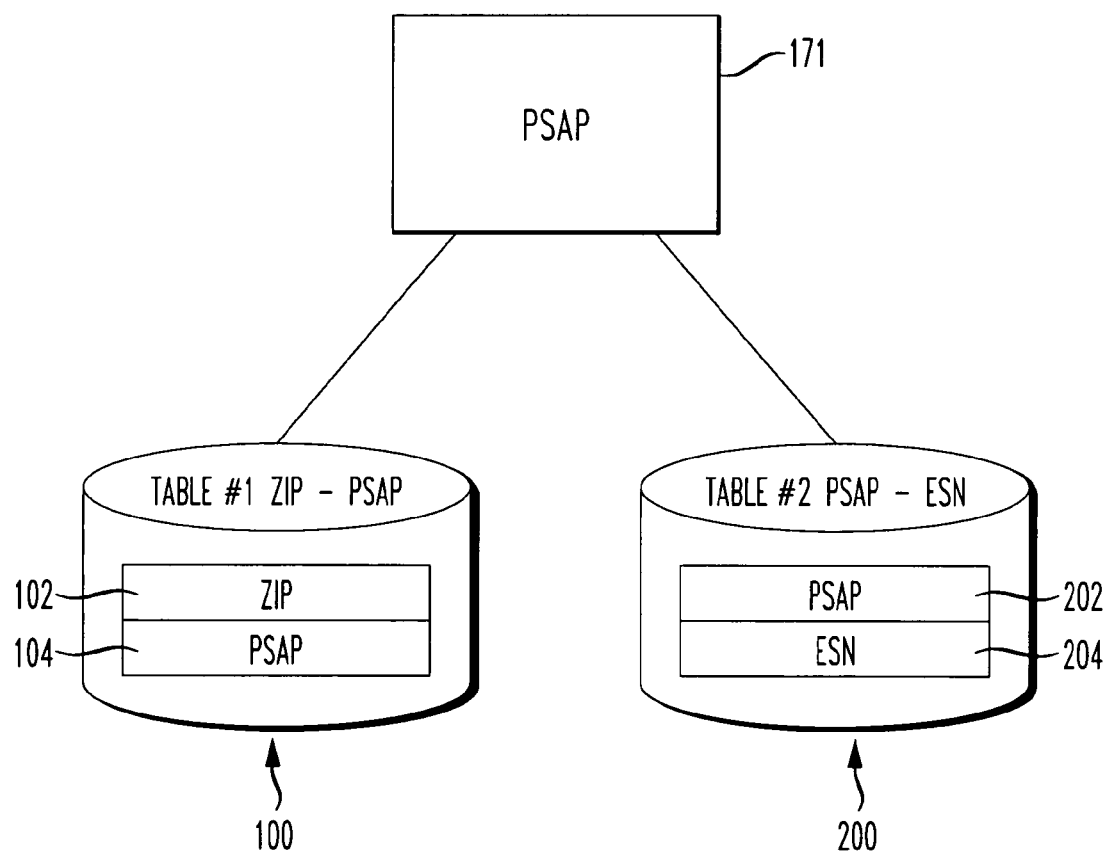
FIG. 1 shows a relevant portion of a 911 service network including exemplary VoIP table routing stores associating PSAPs to ZIP codes, and PSAPs to Emergency Service Numbers (ESNs), in accordance with the principles of the present invention.

FIG. 1 shows a relevant portion of a 911 service network including exemplary VoIP table routing stores, a first associating ZIP codes to PSAPs, and another associating PSAPs to Emergency Service Numbers (ESNs), in accordance with the principles of the present invention.

In particular, as shown in FIG. 1, the exemplary table routing store comprises both a ZIP code to PSAP association store 100, and a PSAP to ESN association store 200.

The first table, i.e. the ZIP code to PSAP association store 100, lists all postal ZIP codes 102 that intersect into the physical boundary of each respective PSAP's 104 coverage area.

The second table, i.e. the PSAP to ESN association store 200, lists all ESNs 204 that fall within the physical boundary of each respective PSAP 202.

This invention provides the accuracy of landline ALI-based provisioning, while using Cellular 911's just-in-time paradigm for routing calls. This invention begins with the VoIP Subscribers' civic address which is either looked up in a LIS (Location Information Server) at call time or delivered in-band with the emergency call. A matching MSAG (Master Street Address Guide) record is found at call time (see TCS "MSAG Matching" patents). This MSAG record comes from a nation-wide database of MSAG records, providing a single point of contact for the VoIP Carrier regardless of caller location.

In principle, given an MSAG record, the ESN from that record can be used as a simple lookup to find the appropriate PSAP providing exactly the same accuracy of routing as Landline 911. Landline ALIs do this very thing, but these ALIs require that the pre-provisioned (prior to a 911 call) address submitted via SOI already be MSAG-valid. This SOI requirement allows the ALI to simply attach this ESN from the matching MSAG record to the address stored in the ALI for that Subscriber. At the time of a Landline 911 call, it is then trivial for the ALI to get the ESN and choose the correct PSAP.

However, in practice, trying to use the ESN from an MSAG record found from a nationwide MSAG database is more complicated. In the Landline world, widely separated regions never need to handle each other's 911 calls. Because of this, the same ESN value might be used in California and Texas, but clearly it's not the same PSAP (Public-safety answering point). In other words, ESNs are "re-used" nationwide.

This invention resolves the issue of potential ESN duplication by using the ZIP code from the VoIP caller's address. The ZIP code gives the approximate location that sufficiently narrows the area so that ESN duplication is not a risk and allowing the 911 call to be routed to the correct PSAP.

According to the invention, the ESN (from MSAG Matching) plus ZIP code gives the exact PSAP by querying two inventive tables. The first table, the ZIP code to PSAP association store 100, stores the PSAP's ZIP codes, while the second table, the PSAP to ESN association store 200, stores the PSAP's MSAG ESNs.

The ZIP code to PSAP association store 100 is preferably automatically populated using a commercial GIS (Geographic Information System) by intersecting postal (ZIP) and PSAP boundaries.

The PSAP to ESN association store 200 is preferably maintained by collecting the ESNs serviced by a PSAP for each of the approximately 6000+ PSAPs in the nation.

For VoIP callers this invention provides the accuracy of landline ALI-based provisioning, while using Cellular 911's just-in-time paradigm for routing calls. In the first step, the VoIP caller's civic address is either looked up in a LIS (Location Information Server) at call time or alternatively it may be delivered in-band with the emergency call. In the next step a MSAG (Master Street Address Guide) record matching the caller's civic address is looked up, also at call time. This MSAG record comes from a nation-wide database of MSAG records, providing a single point of contact for the VoIP Carrier regardless of caller location.

For a specific Landline ALI and the PSAPs it serves, an ESN uniquely identifies a PSAP. In principal, the ESN from that MSAG record can then be used as a simple lookup to find the appropriate PSAP providing exactly the same accuracy of routing as Landline 911. Landline ALIs do this very thing, by requiring the pre-provisioned (prior to a 911 call) address submitted via SOI already be MSAG-valid. This SOI MSAG-validity requirement on addresses allows the ALI to simply attach this ESN from the matching MSAG record to the address stored in the Landline ALI for that caller. At the time of a Landline 911 call, it is then trivial to choose the correct PSAP using the ESN from the caller's record in the Landline ALI.

However, in practice, trying to use the ESN from an MSAG record found from a nationwide MSAG database is more complicated. In the Landline world, widely separated regions never need to handle each other's 911 calls. Because of this, the same ESN value might be used in California and Texas, but clearly it's not the same PSAP. In other words, ESNs are "re-used" nationwide. This makes nationwide call routing based only on MSAG ESN impossible—if the VoIP caller's ESN is determined to be 33333 (for example), and there are two different PSAPs nationwide that cover ESN 33333, which PSAP should the VoIP caller be routed to?

This invention resolves the ambiguity of ESN re-use for nationwide call routing by also using the postal ZIP code from the VoIP caller's address. The ZIP code gives the approximate location that sufficiently narrows the area so that ESN re-use is not an issue, allowing the 911 call to be routed to the correct PSAP. From the earlier example of ESN 33333, by also using the caller's zip code, there will be only one PSAP that serves the combination of ESN and ZIP.

Figure 2A:
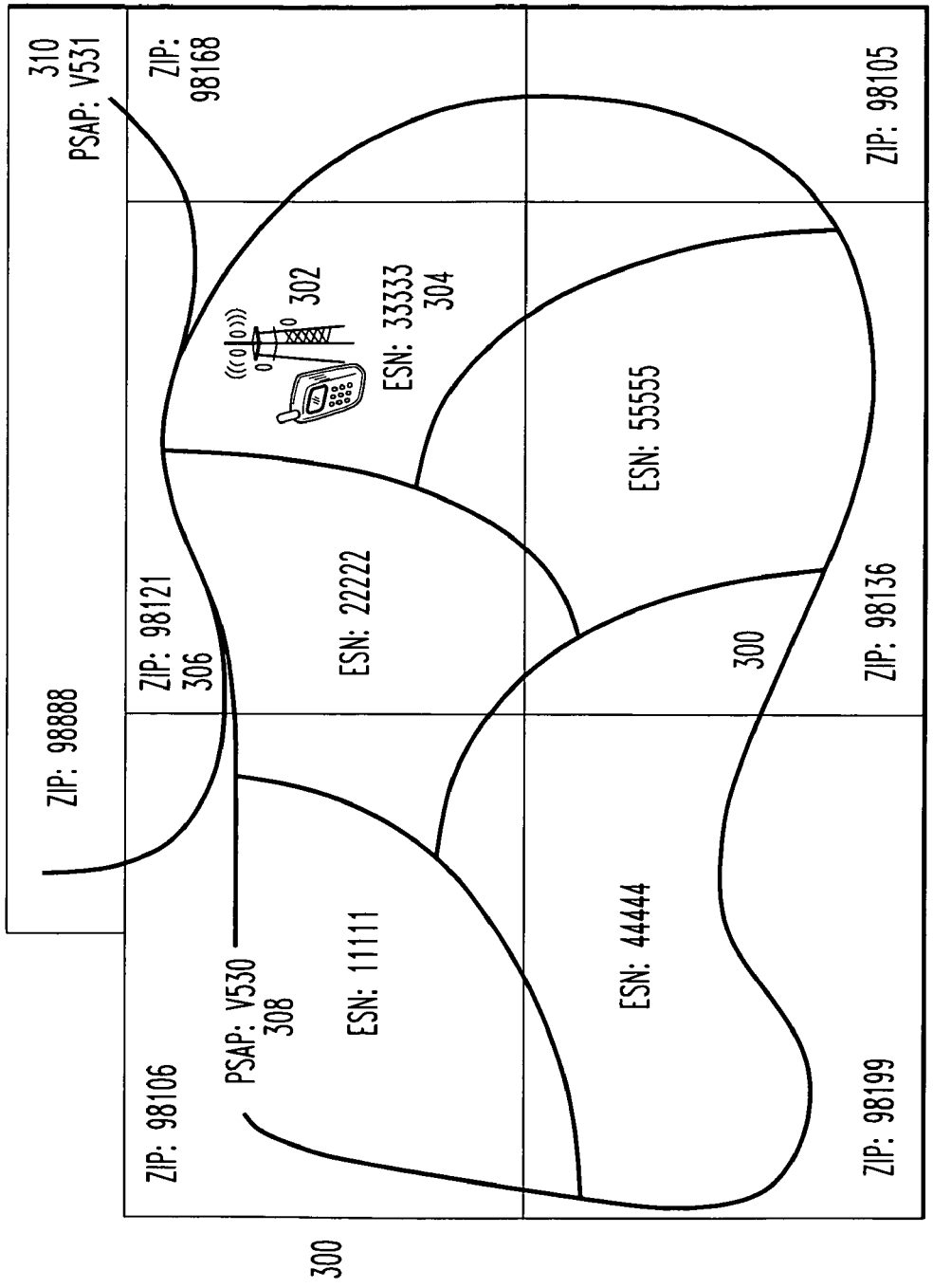
FIG. 2A shows a sample intersection of postal ZIP code, in accordance with the principles of the present invention.

FIG. 2A shows a sample intersection of postal ZIP code, in accordance with the principles of the present invention.

Figure 2B:
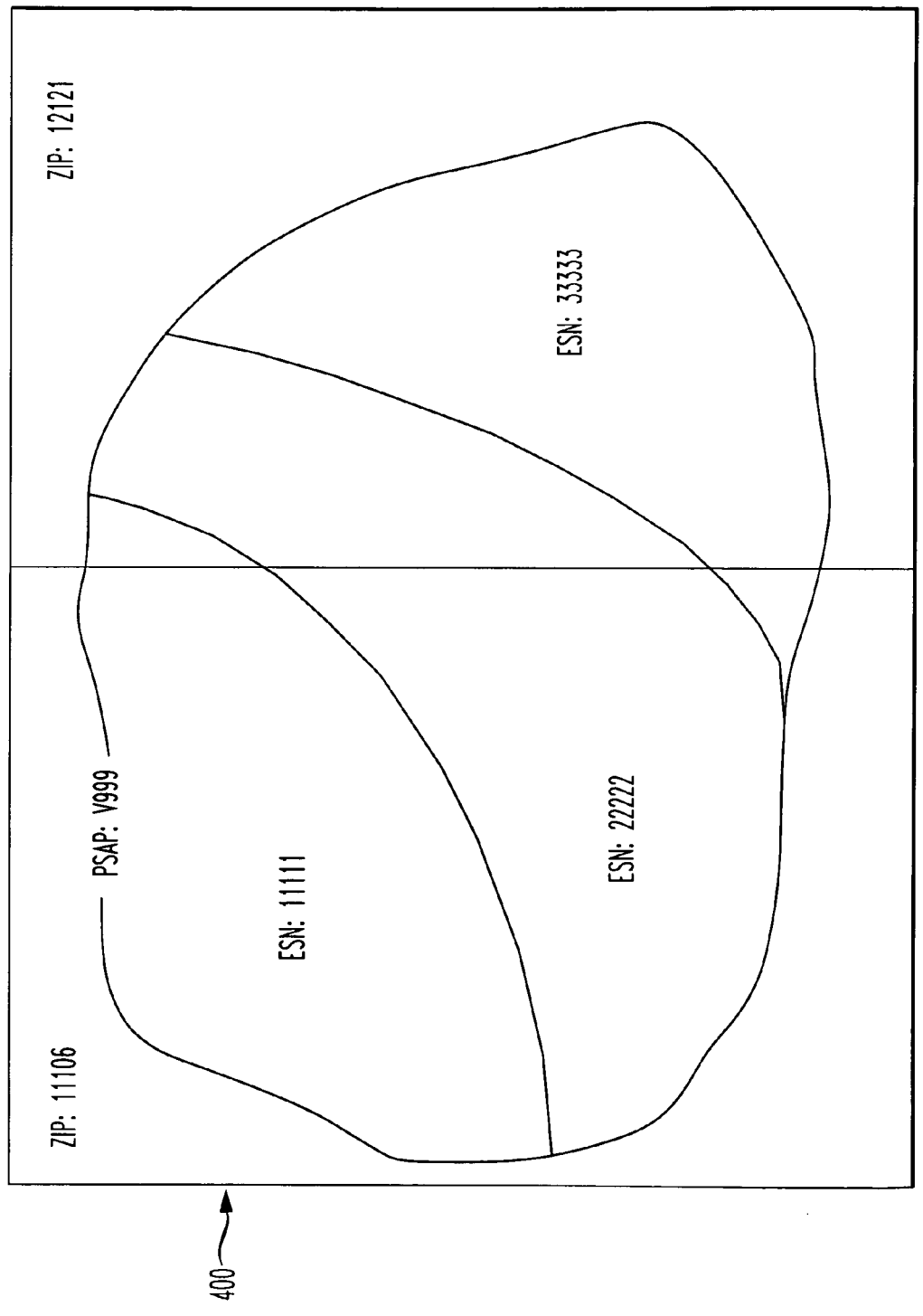
FIG. 2B shows a sample intersection of ESN layers, in accordance with the principles of the present invention. The Emergency Service Number, ESN, is a three to five digit number representing a unique combination of emergency service agencies, (i.e., Law Enforcement, Fire, and Emergency Medical Service) designated to serve a specific range of addresses within the geographical area served by a PSAP.

In particular, as shown in FIGS. 2A and 2B, the physical boundaries of the area serviced by a PSAP on the western edge of the nation with the designation V530 (also referred to as ID V530 in the following) and the physical boundaries of the six postal ZIP codes 98106, 98121, 98168, 98199, 98136 and 98105 300. Furthermore, PSAP V530 services five ESNs: 11111-55555. A sample caller is shown. This caller 302 is calling from ZIP code 98121 304 and has a civic address that falls within the ESN of 33333 306.

FIG. 2B shows a sample intersection of ESN layers, in accordance with the principles of the present invention. The Emergency Service Number, ESN, is a three to five digit number representing a unique combination of emergency service agencies, (i.e., Law Enforcement, Fire, and Emergency Medical Service) designated to serve a specific range of addresses within the geographical area served by a PSAP.

Also, FIG. 2B shows a PSAP on the eastern edge of the nation with the designation V999 400. This PSAP happens to contain three ESNs with numerical values identical to those of PSAP V530. However, the postal ZIP codes of PSAP V999 are different from the ones that intersect with PSAP V530.

FIG. 3A shows exemplary contents of a sample routing table store with data for the sample shown in FIG. 2A, and FIG. 3B shows exemplary contents of a sample routing table store with data for the sample shown in FIG. 2B.

The data store provides a simple way of determining the correct PSAP that can service an emergency call originating from a VoIP caller by simply matching the caller's Civic Address against a nationwide MSAG data store that will result in the MSAG ESN which together with the caller's ZIP code lead to the PSAP.

In particular, the ESN (from MSAG Matching) plus postal ZIP code gives the exact PSAP by querying the two tables. The ZIP code to PSAP association store 100 stores the PSAP's ZIP codes, and the PSAP to ESN association store 200 stores the ESN contained within the PSAP's physical servicing boundary.

The ZIP code to PSAP association store 100 is preferably automatically populated using a commercial GIS (Geographic Information System) by intersecting postal (ZIP) and PSAP boundaries.

The PSAP to ESN association store 200 is preferably maintained by collecting the ESNs serviced by a PSAP for the approximately 6000+ PSAPs in the nation.

In this particular example, the ZIP code to PSAP association store 100 includes two entries 506, 518 for the caller's ZIP code of 98121, meaning that the area represented by the caller is serviced by two neighboring PSAPs (PSAP V530 308 and PSAP V531 310). With that information alone, the correct PSAP cannot be determined.

However, in accordance with features provided by the present invention, although the caller's ESN appears twice 606, 616 (for two geographically very distant PSAPs), it falls out that only one of these rows 606 matches up by PSAP 506 to the caller's ZIP code in the ZIP code to PSAP association store 100, thereby reliably yielding the correct PSAP in an inventive way, in accordance with the principles of the present invention.

While the invention has been described with reference to the exemplary embodiments thereof, those skilled in the art will be able to make various modifications to the described embodiments of the invention without departing from the true spirit and scope of the invention.

What is claimed is:

1. A method of providing routing of an emergency call to a reliably proper public safety access point (PSAP), comprising:
   receiving a request for location relating to an emergency call from an emergency wireless device
   obtaining a street address associated with said emergency wireless device;
   determining at least one PSAP associated with a ZIP code of said street address;
   determining at least one PSAP associated with an emergency services number (ESN) assigned to said emergency call; and
   providing for use by a routing device an identity of a matching unique PSAP associated with both a ZIP code of said street address and said ESN.

2. The method of providing routing of an emergency call to a reliably proper public safety access point (PSAP) according to claim 1, wherein:
   said address is determined using a query to a Master Street Address Guide (MSAG) device.

3. The method of providing routing of an emergency call to a reliably proper public safety access point (PSAP) according to claim 1, wherein:
   said emergency call is initiated at a wireless voice over Internet Protocol (VoIP) device.

4. The method of providing routing of an emergency call to a reliably proper public safety access point (PSAP) according to claim 1, wherein:
   said emergency call is initiated at a landline voice over Internet Protocol (VoIP) device.

5. The method of providing routing of an emergency call to a reliably proper public safety access point (PSAP) according to claim 1, wherein:
   said emergency call is a voice over Internet Protocol (VoIP) call.

6. A table routing data store in communication with an emergency 911 network, comprising:
   a first table associating input ZIP codes with serving public safety access points (PSAPs); and
   a second table associating input emergency services numbers (ESNs) with PSAPs; and
   a physical interface in communication with a routing device;
   wherein an emergency call is routed by said routing device to a PSAP matched in both said first table and said second table to a given emergency call.

7. A table routing data store in communication with an emergency 911 network according to claim 6, wherein:
   said emergency call is a voice over Internet Protocol (VoIP) call.

* * * * *